United States Patent Office 3,516,877
Patented June 23, 1970

3,516,877
PROCESS FOR PRODUCING CORROSION-RESISTANT COATING ON ARTICLE OF ALUMINUM ALLOY, AND PRODUCT
Pandelis Papafingos, Riverside, and Kornel Bernath, Cucamonga, Calif., assignors to American Metal Climax, Inc., New York, N.Y., a corporation of New York
No Drawing. Filed Feb. 19, 1968, Ser. No. 706,675
Int. Cl. C23f 7/06
U.S. Cl. 148—6.27
10 Claims

ABSTRACT OF THE DISCLOSURE

A chemical conversion process for producing a protective coating on articles of aluminum alloy, having substantially the same resistance as iron to corrosion from NaOH, carbonates, bicarbonates, sulfates and chlorides. The coating is a firmly adherent mixture of oxides of iron and manganese, together with complex aluminum-iron oxides, and is produced by wetting the articles, either by bath or spray, with an aqueous solution of NaOH and $KMnO_4$ under time and temperature conditions to produce the desired chemical reaction. The articles are then wetted with a second aqueous solution containing $FeSO_4$ and $NaHCO_3$ for about one minute.

BACKGROUND OF THE INVENTION

This invention relates to the art of producing corrosion-resistant coatings on articles made of aluminum alloy containing at least some iron. More specifically, the invention has to do with a process for producing a corrosion-resistant coating on irrigation pipe made of aluminum alloy.

In certain locations where the soil or water (or both) are strongly alkaline and contain substantial amounts of carbonates, bicarbonates, sulfates or chlorides, corrosion of aluminum irrigation pipe is a serious matter, and instances have been noted where brand new aluminum irrigation pipe has corroded through within three months from the time it was installed, necessitating replacement. On the other hand, where the soil or water are only slightly alkaline, or neutral, or acid, untreated aluminum pipe is extremely resistant to corrosion and has a long service life.

One reason for rapid corrosion of aluminum pipe in irrigation systems appears to be the formation of a "Differential-Aeration Cell." Such corrosion is very rapid, in particular where irrigation tubing is not properly drained after use. Water remains in the tubing for long periods and is then subject to temperature variations between day and night, involving the dewpoint at the interface and the concentration of corrosive compounds in the water. All of these undoubtedly add their corrosive effects to the corrosion due to a Differential-Aeration Cell.

According to the electrochemical theory, depolarization occurs when oxygen reacts with the hydrogen layer at the surface of the metal to form water, as per the cathodic reaction. The rate of the oxygen/hydrogen reaction depends upon the rate at which oxygen comes in contact with the metal surface. If two portions of the same metal receive oxygen at different rates, a corrosion cell is established. The surface receiving oxygen at the higher rate becomes the cathode and the other the anode. Under such conditions, corrosion of the aluminum is greatly accelerated.

There are a number of well known processes for treating the surface of aluminum to make it more corrosion-resistant, including anodizing, Bonderizing, and Alodine. All of these are effective, but they are fairly expensive processes which are not economically feasible on articles such as aluminum irrigation pipe, which may not require such protection for the majority of installations. It has also been suggested that aluminum irrigation pipe might be given a plating of iron or other metal having good chemical resistance to alkalis, but this would require electroplating, which is relatively expensive. Also, another disadvantage of iron plating aluminum is that it would be subject to electrolysis under certain soil conditions. Iron pipe has long been used for irrigation purposes, but it has the disadvantage of being relatively heavy, and also tending to rust out rapidly, particularly where the soil or water are on the acid side.

SUMMARY OF THE INVENTION

The primary object of the invention is to provide a new process for treating articles of aluminum alloy containing at least some iron, wherein a protective coating is produced on the surface which is extremely resistant to corrosion from alkali.

Another object of the invention is to provide a new process for producing a corrosion-resistant coating on aluminum irrigation pipe, whereby the pipe combines the alkali-corrosion-resistant properties of iron with the light weight and acid-corrosion-resistant properties of aluminum. This is true because, while the coated surface itself has poor acid resistance, the underlying aluminum has good acid resistance, and therefore when installed in a locale having acid soil or water, the outer coating is quickly attacked, baring the acid-resistant aluminum. Thus, aluminum irrigation pipe treated by the present process enjoys the diverse corrosion-resistant properties of both iron and aluminum, while retaining the light weight and other desirable properties of aluminum.

A further object of the invention is to provide a process for producing a corrosion-resistant coating on aluminum irrigation pipe, which is inexpensive, and can be used on all pipe regardless of the fact that only a relatively small percentage of the total may need such protection.

These objects are achieved by briefly immersing the aluminum pipe in a chemical bath which preferentially etches the surface to expose the microscopic iron crystals that are a constitutent part of the alloy, and reacts with the iron to form a firmly adherent film consisting primarily of a mixture of complex aluminum-iron oxides and ferric oxide. The coated pipe thus acquires what might be called an "iron surface", having the excellent alkali-resistance but poor acid-resistance of iron, whereas the underlying aluminum has good acid-resistance. A coating of superior corrosion resistance is obtained by transferring the pipe without rinsing from the first bath to a second bath containing ferrous sulfate and sodium bicarbonate, which has the effect of increasing the iron content in the coating and producing a more impermeable coating.

DESCRIPTION OF THE PREFERRED EMBODIMENTS

Example I

Aluminum irrigation pipe of alloy 5051 containing 0.47% iron was first cleaned and its surface etched by immersing the same briefly in an aqueous solution containing 5% by weight of sodium hydroxide (NaOH). Following this treatment, the cleaned pipe was immersed in a second aqueous bath containing 0.5% by weight of NaOH and 5% by weight of potassium permanganate ($KMnO_4$), at a temperature of 180–200° F. The pipe was left in the bath for five minutes, and was then removed from the solution and rinsed with clear water.

After treatment, the surface of the pipe was distinctly rust-colored, and while some of the color could be wiped off the surface with the hand, the coating could not be rubbed off down to bare metal. The rust color that wipes off is nothing more than a superficial layer of ferric oxide ($Fe_2O_3$) that is not firmly adhered to the underlying layer. Quantometric analysis of the coating showed that it contained approximately 3.0% Mn and about 1.0% Fe. The fact that the coating could not easily be rubbed off indicates that the coating includes complex aluminum-iron oxides formed by oxidation of aluminum-iron alloy (i.e., iron that is dissolved in aluminum), although some of the ferric oxide is possibly formed by oxidation of discrete, microscopic crystals of iron which are embedded in a matrix of aluminum.

It is believed that during the reaction, the iron particles which have been exposed and activated by the etching action of the NaOH are converted first to ferrous hydroxide ($Fe(OH)_2$), and the latter is then gradually oxidized by $KMnO_4$ to $Fe_2O_3$. In like manner, the alloyed aluminum-iron is oxidized to an aluminum-iron oxide, which is firmly bonded to the underlying metal and provides adherence for the $Fe_2O_3$. The permanganate itself forms its own manganese oxide, which also deposits on the surface, and the coating is therefore a mixed oxide.

Pipe coated by the above process was subjected to the standard salt spray corrosion test, and withstood 600 hours of exposure to salt spray of 5% NaCl without evidence of corrosion, whereas untreated control pipe of the same alloy showed signs of corrosion within 48 hours, and was badly corroded at the end of 600 hours.

Example II

Aluminum pipe of alloy 5051 was first cleaned by immersion for approximately 2 minutes in a 5% bath of NaOH at room temperature. The cleaned and lightly etched pipe was then transferred without rinsing to a second aqueous bath consisting of 0.5% by weight of NaOH and 5% by weight of $KMnO_4$, at a temperature of 180° F. After 5 minutes of immersion in this second bath, the pipe was transferred again without rinsing, to a third aqueous bath consisting of a 5% solution of ferrous sulfate ($FeSO_4$) and 5% sodium bicarbonate ($NaHCO_3$), at a temperature of 75° F. After 1 minute in this third bath, the pipe was removed, and allowed to dry without rinsing.

The coating produced by this 3-bath process was somewhat thicker than that produced by Example I, analysis showed that the Fe content of the coating had increased from 1.0% (Example I) to 3.0%, while the Mn content decreased from 3.0% (Example I) to 1.0%. The $NaHCO_3$ is believed to function as a mild oxidizing agent, and the ferrous iron apparently reacts with the permanganate and manganese oxides on the surface of the pipe, causing an exchange of manganese oxides for iron oxide. The coating is somewhat thicker than in the case of Example I, and the salt spray corrosion test showed it to be greatly superior in corrosion resistance to the coating produced by Example I.

Example III

Aluminum pipe of alloy 5051 was first cleaned by immersion for approximately 2 minutes in a 5% bath of NaOH at room temperature, and then transferred without rinsing to a second bath consisting of 0.5% by weight of potassium hydroxide (KOH) and 5% by weight of $KMnO_4$. The temperature of the bath was 80° F., and the pipe was allowed to remain immersed in it for 5 minutes. At the end of this time, the pipe was transferred without rinsing to a third bath consisting of a 5% solution of ferrous chloride ($FeCl_2$) and 5% $NaHCO_3$. After 1 minute of immersion in this third bath at 75° F., the pipe was removed and allowed to dry without rinsing.

The coating produced by the 3-bath treatment of Example III was virtually identical to the coating produced by Example II, and showed the same analysis as the latter. The resistance of the coating of Example III to corrosion in the salt spray corrosion test was almost exactly the same as in Example II.

The same results are obtained by using spraying systems. As a matter of fact, the use of impingement sprays has several advantages over the bath system as an industrial process, among which are: (1) a considerable reduction in cycle time; (2) reduction in the amount of chemicals consumed, where the inside surface only of the pipe is treated; and (3) better adaptability to automated processing. In a spray-treatment system, the need for lifting long pipes which are filled with large amounts of solution that must be drained before transferring from one bath to the next, is eliminated. Since the inside of the pipe is the area primarily needing corrosion protection, the coating of the inside by a spray system provides substantial economy without sacrifice of corrosion protection. A spray system is described in the following example.

Example IV

Aluminum alloy pipe of 5051 alloy was sprayed for 20 minutes with a 5% by weight solution of NaOH. The pipe was then sprayed for 30 minutes with a solution consisting of 5% by weight $KMnO_4$ and 0.5% by weight NaOH, at a temperature of from 180° to 200° F. This was followed by a spray of 5% $FeSO_4$ and 5% $NaHCO_3$ for 2 to 3 minutes. The pipe was then allowed to dry without rinsing.

The coating produced by the spray system of Example IV was indistinguishable from the coating produced by the 3-bath treatment of Example III, and showed the same analysis as the latter. The resistance to corrosion in the salt spray corrosion test was the same as Example III.

To test the coatings produced by the processes of Examples I, II, III and IV for resistance to corrosion under conditions closely simulating field conditions of the type that have given trouble in the past, lengths of treated and untreated (for control) pipe were connected together in a test setup wherein irrigation water of high alkalinity and mineral content mixed with entrained air, was circulated continuously through the pipes and over the outer surface thereof. The water used in this test was Colorado River water with a pH of 7.5 and total mineral content of 722 p.p.m., including 196 p.p.m. of $CaCO_3$, 301 p.p.m. of mixed sulfates of calcium, sodium and potassium, and 102 p.p.m. of mixed chlorides, mostly NaCl. After 60 days of exposure to this test, the coatings of Examples II, III and IV showed no signs of corrosion; the coatings of Example I showed only slight pinhole corrosion, whereas the untreated pipe was corroded all the way through. As early as 10 days after the start of the test, the untreated pipe showed considerable evidence of corrosion, although none of the coatings produced by Examples I, II, III or IV showed any perceptible sign of corrosion. By the 30th day of the test, the untreated pipe was badly corroded, and in the coating of Example I, only the first signs of pinhole corrosion had become barely perceptible.

In another test simulating the field conditions producing accelerated corrosion of irrigation pipe, and involving Differential Aeration Cells, combined with corrosion through concentration cells, numerous samples of coated and uncoated pipe sections, 1 foot in length and 3 inches in diameter, of alloy 5051, were placed in individual glass jars, in which the water level was controlled to submerge only half of the tubing. Water and air were simultaneously fed through the system, and at regular intervals measured quantities of 5% NaCl solution were fed through the system. The test was repeated, using other sets of pipe sections, each of which was coated on half its surface and bare on the other half.

The results were most conclusive. None of the coated pipes developed any corrosion whatever, while bare pipe formed corrosion cells, in many cases as soon as 48 hours after the start of testing. With prolonged testing, the bare pipes corroded all the way through, while the coated pipes remained untouched by corrosion.

One thing that became evident in the course of our experiments is that the oxidizer used in bath 2 of Examples I, II and III, and in the second spray of Example IV, must be active in a strongly alkaline solution. There are relatively few oxidizers that meet this requirement—the most notable example of one that does being potassium permanganate. Also, where a third bath is used, as in Examples II and III (or a third spray, as in the case of Example IV), the iron ions should be ferrous ions, which may be supplied by any of several salts besides $FeSO_4$ and $FeCl_2$. These ferrous ions of the third bath are exchanged for some of the manganese ions in the manganese oxide produced in the coating by the reaction of the $KMnO_4$, which explains the increase of iron and decrease of manganese in the coatings produced by Examples II, III and IV, as compared with the coating of Example I.

The coatings of the present invention are relatively inexpensive to produce, owing to the low cost of the chemicals used, and the fact that no electrolytic treatment is involved. Because of its exceptional resistance to alkali corrosion, the coating produced by the present invention makes it feasible to use aluminum alloy for drain pipes, oil field drainage lines, waste disposal lines, vent lines, and the like. While we have referred only to alloy 5051 in the foregoing examples, any aluminum alloy containing iron may be used, and the higher the iron content the better the resultant coating. By varying the composition of the alloy, particularly as to the amount of Fe, a heavier or lighter coating may be obtained, with correspondingly greater or lesser corrosion resistance. However, such variation in constituents may compromise some of the physical properties of the aluminum alloy.

We claim:

1. The process for producing a corrosion-resistant coating on an article of aluminum containing at least some iron among its constituent elements, said process comprising the steps of:
   (1) cleaning and lightly etching the surface of said article with a caustic solution; and
   (2) wetting said cleaned and lightly etched surface with a solution containing a caustic agent for preferentially etching the surface of the aluminum to expose and activate the iron constituent in the alloy, and an oxidizing agent of the type that is active in an alkaline medium, for a period of time and at a temperature to produce an etched surface having a firmly adherent thin coating thereon consisting primarily of a mixture of ferric oxide and complex aluminum-iron oxides.

2. The process of claim 1, wherein the solution of said second step is a caustic solution containing potassium permanganate, and said coating consists of mixed oxides of iron and manganese, together with complex aluminum-iron oxides.

3. The process of claim 2, wherein said article is treated with a third step comprising wetting the article with a solution containing ferrous ions and a mild oxidizing agent, whereby some of the ferrous ions are exchanged for manganese ions in the coating, to form an augmented iron oxide coating.

4. The process of claim 3, wherein the solution of said third step consists of a solution of $FeSO_4$ and $NaHCO_3$.

5. The process of claim 4, wherein the solution of said first step comprises a solution of approximately 5% by weight of NaOH; the solution of said second step comprises a solution of approximately 0.5% by weight of NaOH and approximately 5% by weight of $KMnO_4$; and the solution of said third step comprises a solution of approximately 5% by weight of $FeSO_4$ and 5% by weight of $NaHCO_3$.

6. The process of claim 5, wherein the solution of said second step is maintained at a temperature of 180–200° F., and said article is exposed to this solution for a period of about 5 minutes; and the solution of said third step is maintained at a temperature of about 75° F., and said article is wetted thereby for a period of about 1 minute.

7. The process of claim 4, wherein said article is successively immersed in three baths containing the solutions of steps 1, 2 and 3, respectively.

8. The process of claim 4, wherein said article is successively sprayed with the solutions of steps 1, 2 and 3, respectively.

9. An aluminum product having a corrosion-resistant surface coating formed thereon by the process of claim 1.

10. An aluminum product having a corrosion-resistant surface coating formed thereon by the process of claim 5.

References Cited

UNITED STATES PATENTS

| 2,129,840 | 9/1938 | Hessenbruch | 148—6.14 |
| 3,039,899 | 6/1962 | Keller et al. | 148—6.14 |
| 3,379,580 | 4/1968 | Zeigler | 75—138 |

RALPH S. KENDALL, Primary Examiner

U.S. Cl. X.R.

148—6.14